US012415709B2

(12) United States Patent
Huang

(10) Patent No.: US 12,415,709 B2
(45) Date of Patent: Sep. 16, 2025

(54) AUTOMATIC TRANSPORT DEVICE

(71) Applicant: Otis Elevator Company, Farmington, CT (US)

(72) Inventor: Qiping Huang, Hangzhou (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 57 days.

(21) Appl. No.: 18/446,578

(22) Filed: Aug. 9, 2023

(65) Prior Publication Data

US 2024/0166473 A1 May 23, 2024

(30) Foreign Application Priority Data

Nov. 22, 2022 (CN) ........................ 202211469655.4

(51) Int. Cl.
*B66B 23/04* (2006.01)
*B66B 23/20* (2006.01)

(52) U.S. Cl.
CPC .............. *B66B 23/04* (2013.01); *B66B 23/20* (2013.01)

(58) Field of Classification Search
CPC ......... B66B 23/04; B66B 23/20; B66B 23/16; B66B 23/06; B66B 23/026
See application file for complete search history.

(56) References Cited

U.S. PATENT DOCUMENTS 1,963,413 A 6/1934 Leonard et al.
2,071,813 A 2/1937 Bouton et al.
2,929,483 A 3/1960 Minejiro
4,200,177 A * 4/1980 Sato ........................ B66B 23/04 226/186
4,589,539 A * 5/1986 Boltrek .................. B66B 23/04 198/331

(Continued)

FOREIGN PATENT DOCUMENTS

CN 203781604 U * 8/2014
CN 103112774 B 8/2015

(Continued)

OTHER PUBLICATIONS

European Search Report for Application No. 23199981.4, Issued Feb. 21, 2024.

*Primary Examiner* — Gene O Crawford
*Assistant Examiner* — Abby A Jorgensen
(74) *Attorney, Agent, or Firm* — CANTOR COLBURN LLP

(57) ABSTRACT

An automatic transport device includes a first side and a second side opposite to each other, the first side includes a main drive device, a step drive wheel and a first handrail drive wheel in transmission connection with the main drive device, and the second side is provided with: a step driven wheel; a second handrail drive wheel, the handrail of the automatic transport device wraps around the first handrail drive wheel and the second handrail drive wheel; a first tensioning device and a first transmission member, the first tensioning device is capable of adjusting the movement of the step driven wheel relative to the step drive wheel, thereby maintaining the first transmission member between the step drive wheel and the step driven wheel in tension; and a second tensioning device and a second transmission member, the second handrail drive wheel is in transmission connection with the step driven wheel.

12 Claims, 3 Drawing Sheets

(56) References Cited

U.S. PATENT DOCUMENTS

| | | | | | |
|---|---|---|---|---|---|
| 5,125,494 | A * | 6/1992 | Nurnberg | B66B 23/04 198/330 |
| 5,207,308 | A | 5/1993 | Sheffield et al. | |
| 5,638,937 | A | 6/1997 | Birney et al. | |
| 5,755,315 | A * | 5/1998 | Wallbaum | B66B 23/04 198/330 |
| 5,782,333 | A | 7/1998 | Pitts | |
| 5,881,859 | A * | 3/1999 | Bianchi | B66B 23/04 198/335 |
| 2016/0016760 | A1* | 1/2016 | Srb-Gaffron | B66B 23/20 198/336 |
| 2019/0071286 | A1* | 3/2019 | Dong | B66B 23/04 |
| 2023/0356983 | A1* | 11/2023 | Ortbauer | B66B 25/006 |

FOREIGN PATENT DOCUMENTS

| | | | | | |
|---|---|---|---|---|---|
| CN | 106185584 | A | * | 12/2016 | |
| CN | 107021411 | A | * | 8/2017 | |
| CN | 105764832 | B | | 9/2017 | |
| CN | 209177834 | U | | 7/2019 | |
| CN | 110217681 | A | | 9/2019 | |
| CN | 110921478 | A | | 3/2020 | |
| CN | 210286418 | U | | 4/2020 | |
| CN | 211470505 | U | | 9/2020 | |
| CN | 112125114 | A | | 12/2020 | |
| CN | 112707299 | A | | 4/2021 | |
| CN | 216471698 | U | | 5/2022 | |
| CN | 216836719 | U | | 6/2022 | |
| EP | 0640553 | A3 | | 8/1995 | |
| EP | 0580425 | B1 | | 6/1997 | |
| EP | 0794147 | A1 | | 9/1997 | |
| WO | WO-2020238431 | A1 | * | 12/2020 | B66B 23/026 |

* cited by examiner

AUTOMATIC TRANSPORT DEVICE

FOREIGN PRIORITY

This application claims priority to Chinese Patent Application No. 202211469655.4, filed Nov. 21, 2022, and all the benefits accruing therefrom under 35 U.S.C. § 119, the contents of which in its entirety are herein incorporated by reference.

FIELD OF THE INVENTION

The present invention relates to an automatic transport device, and in particular, handrail drive mechanism of an automatic transport device.

BACKGROUND OF THE INVENTION

The existing automatic transport devices, such as escalators and moving walkways, are provided with handrails. The handrail is driven by the handrail drive wheel, wherein the handrail drive wheel is coupled with the step tread drive wheel through chains on the motor room side, and the step tread drive wheel is further driven by the drive motor in the motor room through chains, while there is conventionally no the handrail drive wheel arranged on the transmission side opposite to the motor room side. When escalators and moving walkways are progressing to longer distances, such as 60 meters or longer, the driving force provided by the handrail drive wheel on the motor room side alone may be insufficient, which will cause the handrail to slip, thus affecting the passenger experience and safety.

SUMMARY OF THE INVENTION

The object of the present application is to solve or at least alleviate problems existing in the prior art.

According to one aspect, an automatic transport device is provided, which comprises a first side and a second side opposite to each other, wherein the first side is provided with: a main drive device, a step drive wheel and a first handrail drive wheel in transmission connection with the main drive device; wherein the second side is provided with: a step driven wheel; a second handrail drive wheel in transmission connection with the step driven wheel, wherein the handrail of the automatic transport device wraps around the first handrail drive wheel and the second handrail drive wheel; a first tensioning device and a first transmission member, wherein the first tensioning device is capable of adjusting the movement of the step driven wheel relative to the step drive wheel, thereby maintaining the first transmission member between the step drive wheel and the step driven wheel in tension; and a second tensioning device and a second transmission member, wherein the second handrail drive wheel is in transmission connection with the step driven wheel through the second transmission member, and the second tensioning device is capable of maintaining the second transmission member in tension during movement of the step driven wheel.

Optionally, in an embodiment of the automatic transport device, the second transmission member is a transmission chain that wraps around the second handrail drive wheel and the step driven wheel.

Optionally, in an embodiment of the automatic transport device, the second tensioning device is a floating gear device acting on the second transmission member, wherein the floating gear device comprises: a floating body and a first wheel on the floating body, the bottom of the first wheel being wrapped around and supported by the second transmission member, and the floating body being mounted in the track so as to float up and down.

Optionally, in an embodiment of the automatic transport device, the floating body further comprises a second wheel, the bottom of which is wrapped around and supported by the second transmission member.

Optionally, in an embodiment of the automatic transport device, the second transmission member comprises a first section and a second section extending between the second handrail drive wheel and the step driven wheel respectively, wherein the first wheel and the second wheel are supported by the first and second sections of the second transmission member respectively.

Optionally, in an embodiment of the automatic transport device, the first and second wheels are arranged vertically up and down.

Optionally, in an embodiment of the automatic transport device, the first and second wheels are located on a first side of the floating body, and a counterweight is provided on a second side of the floating body.

Optionally, in an embodiment of the automatic transport device, the floating body is arranged in a vertically movable manner on a floating device bracket that is fixed to a mounting frame between the second handrail drive wheel and the step driven wheel, wherein the floating device bracket can be mounted at any of a plurality of mounting positions on the mounting frame.

Optionally, in an embodiment of the automatic transport device, the floating device bracket comprises one or more vertically extended guide columns, and the floating body comprises a linear bearing sleeved on the guide column.

Optionally, in an embodiment of the automatic transport device, a first guide wheel set is provided between the floating gear device and the second handrail drive wheel, the first guide wheel set comprising a pair of guide wheels respectively engaged with the first and second sections of the second transmission member, and a second guide wheel set is provided between the floating gear device and the step driven wheel, the second guide wheel set comprising another pair of guide wheels respectively engaged with the first and second sections of the second transmission member.

Optionally, in an embodiment of the automatic transport device, the respective guide wheels of the first and second guide wheel sets are arranged vertically up and down.

Optionally, in an embodiment of the automatic transport device, the upper parts of the respective guide wheels of the first and second guide wheel sets are engaged with the first and second sections of the second transmission member, and the positions of the first and second guide wheel sets are arranged such that the first and second section of the second transmission member are M-shaped.

Optionally, in an embodiment of the automatic transport device, the positions of the first guide wheel set, the second guide wheel set and the floating gear device are arranged such that the ratio of the horizontal displacement of the step driven wheel to the vertical displacement of the floating gear device is within the range of 2:1 to 4:1.

Optionally, in an embodiment of the automatic transport device, the first transmission member is a step chain wrapping around the step drive wheel and the step driven wheel, and the first tensioning device is a spring mechanism connected to a movable bracket supporting the step driven wheel, wherein the movable bracket is movable horizontally, and the spring mechanism tends to move the movable bracket and the step driven wheel thereon in a direction away from the step drive wheel.

Optionally, in an embodiment of the automatic transport device, the automatic transport device is a moving walkway or an escalator, wherein the automatic transport device has a length greater than 60 meters.

The automatic transport device according to the embodiments of the present invention provides sufficient belt driving force when the belt length increases.

BRIEF DESCRIPTION OF THE DRAWINGS

With reference to the accompanying drawings, the disclosure of the present application will become easier to understand. Those skilled in the art would easily understand that these drawings are for the purpose of illustration, and are not intended to limit the protection scope of the present application. In addition, in the figures, similar numerals are used to denote similar components, where.

DETAILED DESCRIPTION OF EMBODIMENT(S) OF THE INVENTION

Figure 1:
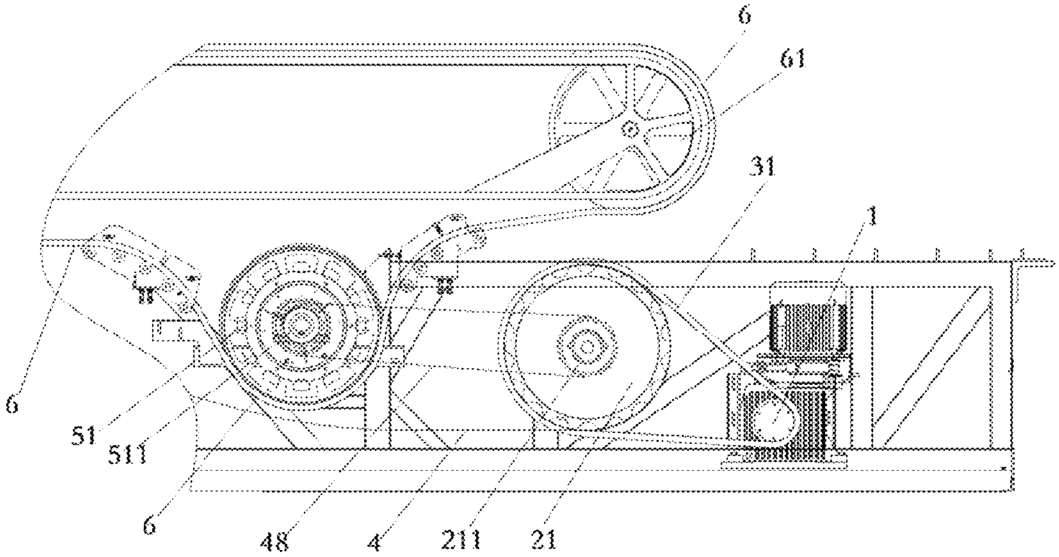
FIG. 1 is a schematic diagram of a first side of an automatic transport device according to an embodiment of the present invention.
Figure 2:
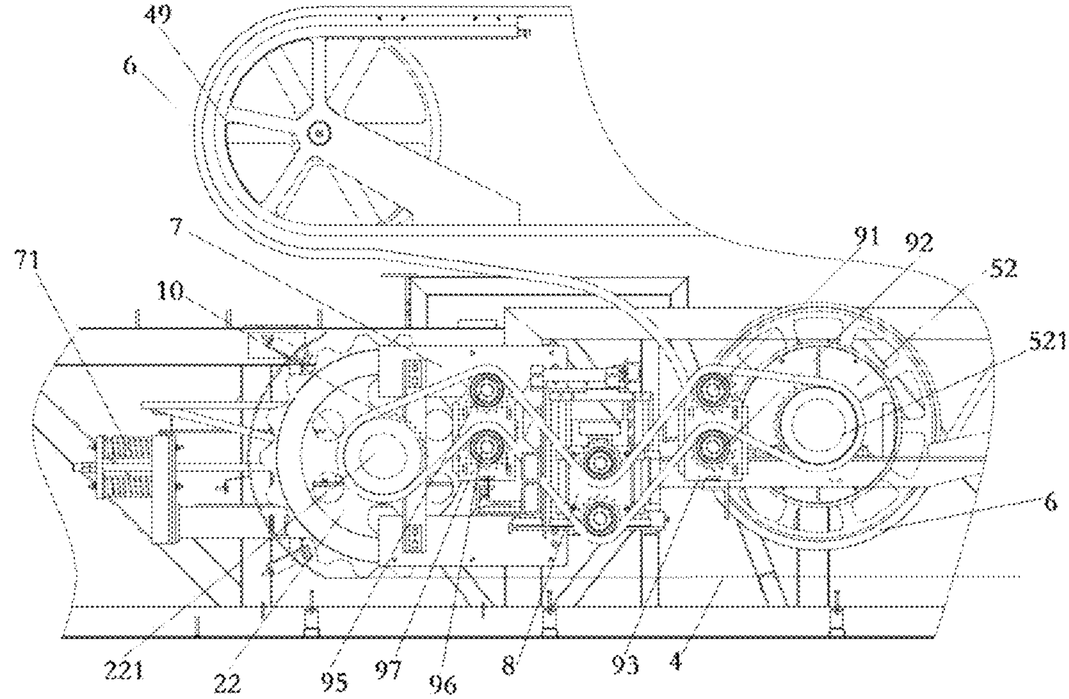
FIG. 2 is a schematic diagram of a second side of an automatic transport device according to an embodiment of the present invention.

FIGS. 1 and 2 respectively show a first side and a second side of an automatic transport device that are opposite to each other. The first side is also referred to as the motor room side, with a main drive device arranged underneath for driving the automatic transport device. The second side is also referred to as the transmission side, with some transmission wheels arranged underneath. Depending on the type of the automatic transport device, the first and second sides thereof can be on the same horizontal plane or on two different floors. When the automatic transport device is a moving walkway, the first and second sides thereof are on the same horizontal plane. When the automatic transport device is an escalator, its first side is generally on the higher level and the second side thereof is on the lower level. The automatic transport device is provided on its first side, for example, underneath its cover plate, with: a main drive device 1, a step drive wheel 21 and a first handrail drive wheel 51 in transmission connection with the main drive device 1. More specifically, the main drive device 1 may be a motor that drives the step drive wheel 21 through a belt 31, and the step drive wheel 21 further includes a small gear 211, which drives a small gear 511 of the first handrail drive wheel 51 through a chain 48 to drive the first handrail drive wheel 51 to rotate. Therefore, both the step drive wheel 21 and the first handrail drive wheel 51 are powered by the main drive device 1 to rotate. In addition, both the step drive wheel 21 and the first handrail drive wheel 51 are fixedly arranged. The rotation of the step drive wheel 21 will drive a first transmission member that wraps around it, such as a step chain 4 or any belt-based transmission member, thereby driving the step treads connected to the first transmission member to move. The rotation of the first handrail drive wheel 51 will drive a handrail 6 that wraps around it, where the handrail 6 further wraps a first guide wheel 48.

The automatic transport device is provided on its second side, for example, underneath the cover plate, with: a step driven wheel 22 and a second handrail drive wheel 52 in transmission connection with the step driven wheel 22. On the second side, the second handrail drive wheel 52 is wrapped around by the handrail 6, while the step driven wheel 22 is wrapped around by the step chain 4, where the handrail 6 further wraps a second guide wheel 49. The second handrail drive wheel 52 is fixedly arranged. However, in order to maintain the tension of the first transmission member, such as the step chain 4, the step driven wheel 22 is arranged to be movable, and a first tensioning device is provided. The first tensioning device can adjust the movement of the step driven wheel 22 relative to the step drive wheel 21, thereby maintaining the first transmission member (i.e., the step chain 4) between the step drive wheel 21 and the step driven wheel 22 in tension. In the embodiment shown in FIG. 2, for example, the first tensioning device is the spring mechanism 71, where the step driven wheel 22 is tend to move horizontally to the left under the action of the spring mechanism 71. During the long-term use of the automatic transport device, the step chain 4 will extend, but the movement trend of the step driven wheel 22 will ensure that the tension on the first transmission member 4 will still be maintained even when the step chain 4 is extended. In addition, in an embodiment of the present invention, the second handrail drive wheel 52 is in transmission connection with the step driven wheel 22 through a second transmission member, and a second tensioning device is provided. The second tensioning device can maintain the second transmission member in tension when the step driven wheel 22 moves, thereby ensuring that the second handrail drive wheel 52 can receive driving force from the step driven wheel 22, so that the second handrail drive wheel 52 and the first handrail drive wheel 51 jointly provide driving force to the handrail 6 on the two sides of the automatic transport device. With this arrangement, sufficient and balanced driving force can still be provided to the handrail 6 even when the automatic transport device has a relatively long distance, e.g., greater than 60 meters or greater than 80 meters, making the handrail thus arranged less likely to slip, especially when a great many passengers are in contact with the handrail on the automatic transport device. In some embodiments, the second transmission member is a transmission chain 10, or any other suitable belt transmission member. The second tensioning device may be a floating gear device 8 detailed below, or any other suitable tensioner for belt transmission member.

Figure 3:
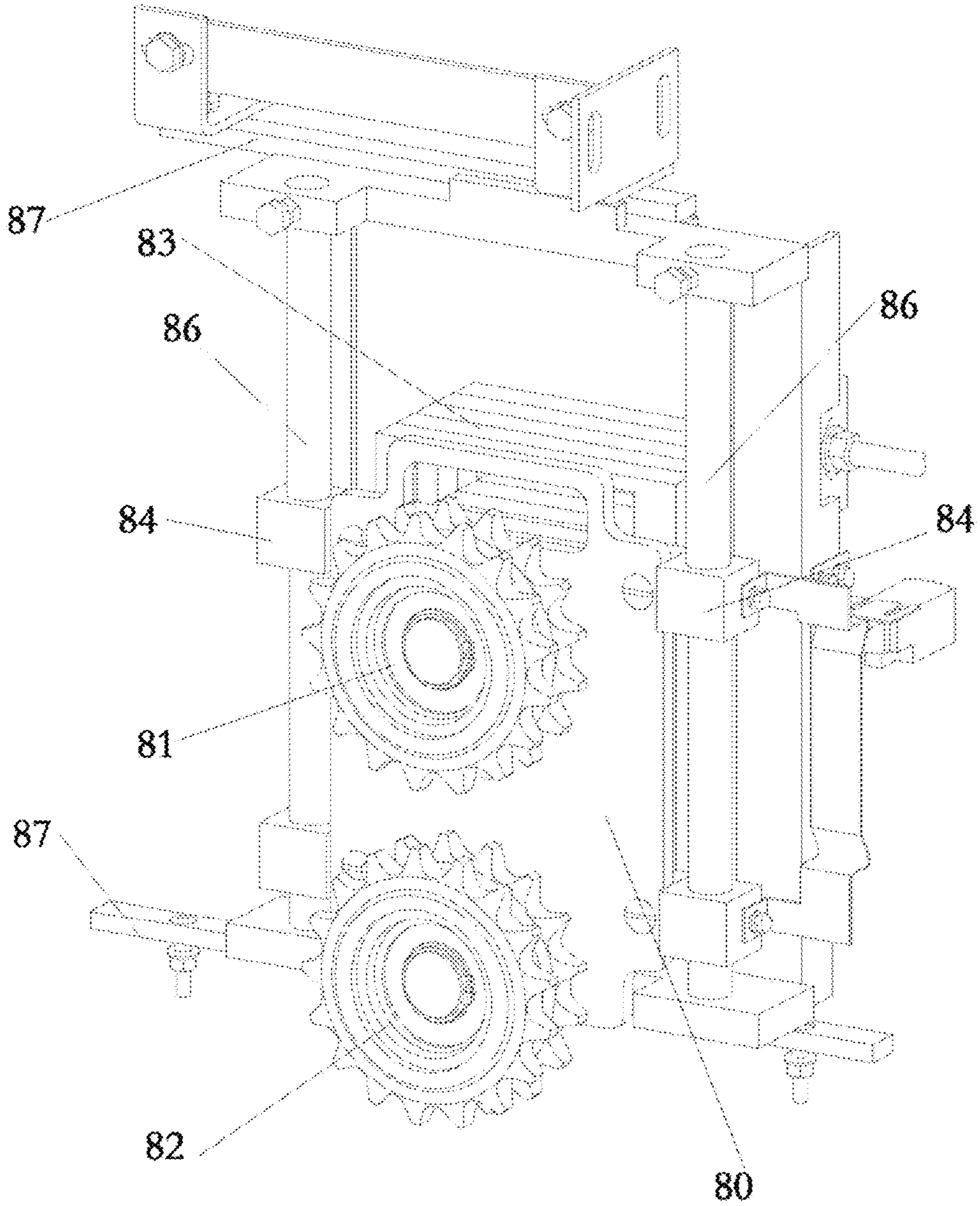
FIG. 3 is an enlarged view of a floating gear device according to an embodiment of the present invention.

With continued reference to FIGS. 2 and 3, the specific structure of the floating gear device 8, which can be used as a second tensioning device, is shown. The floating gear device 8 comprises: a floating body 80 and a first wheel 81 on the floating body, wherein the bottom of the first wheel 81 is wrapped around and supported by a second transmission member, such as a transmission chain 10, and the floating body 8 is mounted in the track to float up and down. With this arrangement, since the second transmission member, such as the transmission chain 10, supports the floating gear device 8, the transmission chain 10 can be continuously maintained in tension during movement of the step driven wheel 22, thereby ensuring the transmission of force from the step driven wheel 22 to the second handrail drive wheel 52. In some embodiments, the floating body 80 is also provided with a second wheel 82, the bottom of which is also wrapped around and supported by the transmission chain 10.

In some embodiments, the transmission chain 10 includes first and second sections 11 and 12 extending between the second handrail drive wheel 52 and the step driven wheel 22 respectively, where the first and second sections 11 and 12 have opposite movement directions. When only the first wheel 81 is included, the first wheel 81 can be supported by any one of the first section 11 and the second section 12. When the first wheel 81 and the second wheel 82 are included, the first wheel 81 and the second wheel 82 can be wrapped around and supported by the first section 11 and the second section 12 of the second transmission member respectively. In some embodiments, the first wheel 81 and the second wheel 82 are arranged vertically up and down. Alternatively, the first wheel 81 and the second wheel 82 can also be staggered vertically. In some embodiments, the first wheel 81 and the second wheel 82 are located on the first side of the floating body 80, while a counterweight 83 can be arranged on the second side of the floating body 80. The number and weight of the counterweight 83 can be adjusted, so as to adjust the preset tensioning force on the transmission chain 10 accordingly. In an alternative embodiment, the floating body 80 may have a relatively large weight, so as to reduce or even eliminate the need for counterweight 83. In some embodiments, the floating body 80 can be arranged in a vertically movable manner on a floating device bracket 85, while the floating device bracket 85 is fixed to a mounting frame between the second handrail drive wheel 52 and the step driven wheel 22, e.g., on a cross beam 87 between these two. The cross beam 87 may have a plurality of mounting positions, such as a plurality of mounting holes or a waist-shaped hole, so that the floating device bracket 85 can be mounted at any of the mounting positions between the second handrail drive wheel 52 and the step driven wheel 22, thereby enabling predetermined mounting position of the floating device bracket 85. In some embodiments, the floating device bracket 85 includes two vertically extended guide columns 86, and the two sides of the floating body include linear bearings 84 sleeved on the guide columns 86. For example, as shown in the figures, each side may include two linear bearings 84 arranged at the upper and lower positions. In an alternative embodiment, the number and positions of the guide columns can be changed. Or, alternatively, any other suitable track can be selected.

In addition, as shown in FIG. 2, in some embodiments, a first guide wheel set 93 is provided between the floating gear device 8 and the second handrail drive wheel 52, where the first guide wheel set 93 includes a pair of guide wheels 91, 92 that respectively engage with the first and second sections 11 and 12 of the second transmission member. In some embodiments, a second guide wheel set 97 is provided between the floating gear device 8 and the step driven wheel 22, wherein the second guide wheel set 97 includes another pair of guide wheels 95, 96 that respectively engage with the first and second sections 11 and 12 of the second transmission member. In some embodiments, the respective guide wheels of the first guide wheel set 93 and those of the second guide wheel set 97 are arranged vertically up and down. In some embodiments, the first section 11 and the second section 12 of the transmission chain 10 wrap around the respective guide wheels of the first guide wheel set 93 and the second guide wheel set 97 from above, and the positions of the first guide wheel set 93, the second guide wheel set 97 and the floating gear device 8 are arranged such that the first section 11 and the second section 12 of the second transmission member are M-shaped. Although not shown, it can be conceived that the first section 11 and the second section 12 of the second transmission member may be V-shaped when the first and second guide wheel sets 93 and 97 are not provided.

Figure 4:
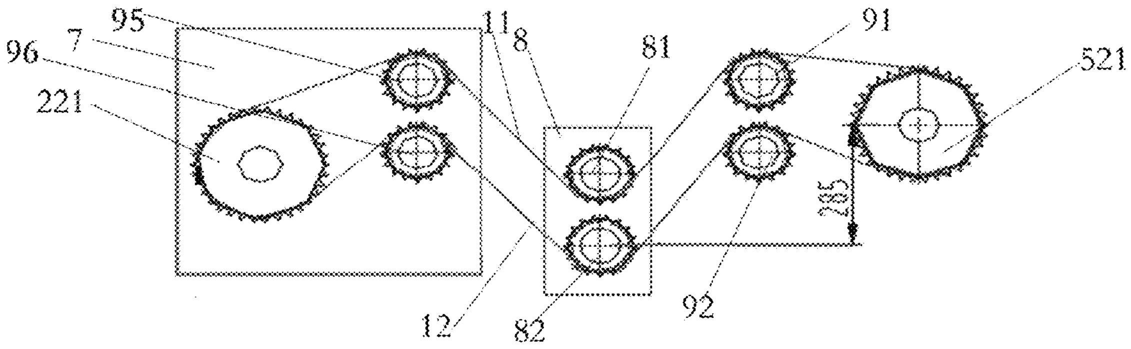
FIGS. 4 and 5 are schematic diagrams of the comparison of the gear positions of the second side of the automatic transport device according to an embodiment of the present invention before and after stretching of the step chain.
Figure 5:
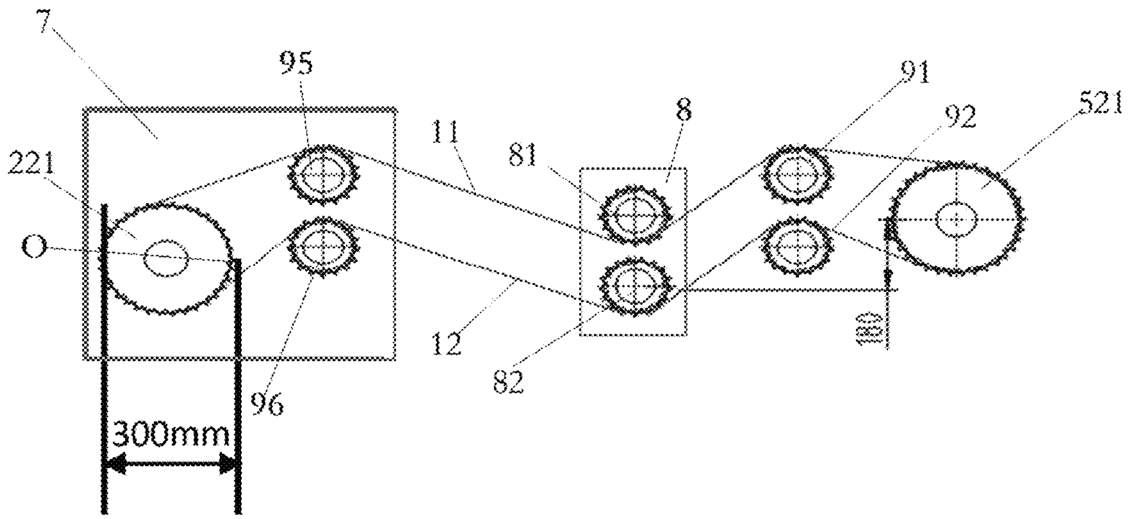

In some embodiments, the second guide wheel set 97 is mounted on a movable bracket 7 together with the step driven wheel 22, where the movable bracket 7 can be moved, for example, horizontally. The first tensioning device is a spring mechanism 71 connected to the movable bracket 7, and the spring mechanism 71 tends to move the movable bracket 7 and the step driven wheel 22 thereon in a direction away from the step drive wheel 21, e.g., to the left in FIG. 2. As shown in FIGS. 4 and 5, during the service life of an automatic transport device, the ratio of the horizontal displacement of the step driven wheel 22 to the vertical displacement of the floating gear device 8 can be between 2:1 to 4:1. In the illustrated embodiment, for example, the step driven wheel 22 and the small gear 221 thereon can move up to 300 mm to the left with the stretching of the first transmission member, while the floating gear device 8 can rise by 105 mm, where the ratio of which is about 3:1. This guarantees the tensioning force of the second transmission member 10 and the transmission of normal driving force.

The automatic transport device according to the embodiments of the present invention provides sufficient belt driving force when the belt length increases and the number of passengers in touch with the handrail increases, thereby making the handrail less susceptible to slipping.

The specific embodiments described above are merely intended to describe the principles of the present application more clearly, wherein various components are clearly shown or described to facilitate the understanding of the principles of the present application. Those skilled in the art may, without departing from the scope of the present application, make various modifications or changes to the present application. Therefore, it should be understood that these modifications or changes should be included within the scope of patent protection of the present application.

What is claimed is:

1. An automatic transport device, comprising a first side and a second side opposite to each other, the first side being provided with a main drive device, a step drive wheel and a first handrail drive wheel in transmission connection with the main drive device;

wherein, the second side is provided with:

a step driven wheel;

a second handrail drive wheel in transmission connection with the step driven wheel, wherein a handrail of the automatic transport device wraps around the first handrail drive wheel and the second handrail drive wheel;

a first tensioning device and a first transmission member, wherein the first tensioning device is capable of adjusting the movement of the step driven wheel relative to the step drive wheel, thereby maintaining the first transmission member between the step drive wheel and the step driven wheel in tension; and a second tensioning device and a second transmission member, wherein the second handrail drive wheel is in transmission connection with the step driven wheel through the second transmission member, and the second tensioning device is capable of maintaining the second transmission member in tension during movement of the step driven wheel;

wherein the second tensioning device is a floating gear device acting on the second transmission member, and wherein the floating gear device comprises: a floating body and a first wheel on the floating body, the bottom of the first wheel being wrapped around and supported by the second transmission member, and the floating body being mounted in a track so as to float up and down;

wherein the floating body further comprises a second wheel, the bottom of which is wrapped around and supported by the second transmission member.

2. The automatic transport device according to claim 1, wherein the second transmission member comprises a first section and a second section extending between the second handrail drive wheel and the step driven wheel respectively, and the first wheel and the second wheel are supported by the first and second sections of the second transmission member respectively.

3. The automatic transport device according to claim 1, wherein the first and second wheels are arranged vertically up and down.

4. The automatic transport device according to claim 1, wherein the first and second wheels are located on a first side of the floating body, and a counterweight is provided on a second side of the floating body.

5. The automatic transport device according to claim 1, wherein the floating body is arranged in a vertically movable manner on a floating device bracket that is fixed to a mounting frame between the second handrail drive wheel and the step driven wheel, and wherein the floating device bracket is mounted at any of a plurality of mounting positions on the mounting frame.

6. The automatic transport device according to claim 5, wherein the floating device bracket comprises one or more vertically extended guide columns, and the floating body comprises a linear bearing sleeved on the guide column.

7. An automatic transport device, comprising a first side and a second side opposite to each other, the first side being provided with a main drive device, a step drive wheel and a first handrail drive wheel in transmission connection with the main drive device;

wherein, the second side is provided with:

a step driven wheel;

a second handrail drive wheel in transmission connection with the step driven wheel, wherein a handrail of the automatic transport device wraps around the first handrail drive wheel and the second handrail drive wheel;

a first tensioning device and a first transmission member, wherein the first tensioning device is capable of adjusting the movement of the step driven wheel relative to the step drive wheel, thereby maintaining the first transmission member between the step drive wheel and the step driven wheel in tension; and a second tensioning device and a second transmission member, wherein the second handrail drive wheel is in transmission connection with the step driven wheel through the second transmission member, and the second tensioning device is capable of maintaining the second transmission member in tension during movement of the step driven wheel;

wherein the second tensioning device is a floating gear device acting on the second transmission member, and wherein the floating gear device comprises: a floating body and a first wheel on the floating body, the bottom of the first wheel being wrapped around and supported by the second transmission member, and the floating body being mounted in a track so as to float up and down;

wherein a first guide wheel set is provided between the floating gear device and the second handrail drive wheel, the first guide wheel set comprising a pair of guide wheels respectively engaged with the first and second sections of the second transmission member, and a second guide wheel set is provided between the floating gear device and the step driven wheel, the second guide wheel set comprising another pair of guide wheels respectively engaged with the first and second sections of the second transmission member.

8. The automatic transport device according to claim 7, wherein respective guide wheels of the first and second guide wheel sets are arranged vertically up and down.

9. The automatic transport device according to claim 7, wherein upper parts of the respective guide wheels of the first and second guide wheel sets are engaged with the first and second sections of the second transmission member, and positions of the first and second guide wheel sets are arranged such that the first and second sections of the second transmission member are M-shaped.

10. The automatic transport device according to claim 9, wherein positions of the first guide wheel set, the second guide wheel set and the floating gear device are arranged such that a ratio of a horizontal displacement of the step driven wheel to a vertical displacement of a floating gear device is within a range of 2:1 to 4:1.

11. An automatic transport device, comprising a first side and a second side opposite to each other, the first side being provided with a main drive device, a step drive wheel and a first handrail drive wheel in transmission connection with the main drive device;

wherein, the second side is provided with:

a step driven wheel;

a second handrail drive wheel in transmission connection with the step driven wheel, wherein a handrail of the automatic transport device wraps around the first handrail drive wheel and the second handrail drive wheel;

a first tensioning device and a first transmission member, wherein the first tensioning device is capable of adjusting the movement of the step driven wheel relative to the step drive wheel, thereby maintaining the first transmission member between the step drive wheel and the step driven wheel in tension; and a second tensioning device and a second transmission member, wherein the second handrail drive wheel is in transmission connection with the step driven wheel through the second transmission member, and the second tensioning device is capable of maintaining the second transmission member in tension during movement of the step driven wheel;

wherein the first transmission member is a step chain wrapping around the step drive wheel and the step driven wheel, and the first tensioning device is a spring mechanism connected to a movable bracket supporting the step driven wheel, and wherein the movable bracket is movable horizontally, and the spring mechanism tends to move the movable bracket and the step driven wheel thereon in a direction away from the step drive wheel.

12. The automatic transport device according to claim 1, wherein the automatic transport device is a moving walkway or an escalator, and the automatic transport device has a length greater than 60 meters.

* * * * *